United States Patent
Zhang et al.

(10) Patent No.: US 11,623,885 B2
(45) Date of Patent: Apr. 11, 2023

(54) METHODS FOR ENHANCING THE DEWATERABILITY OF SLUDGE WITH ENZYME TREATMENT

(71) Applicant: Novozymes A/S, Bagsvaerd (DK)

(72) Inventors: Mingjia Zhang, Beijing (CN); Nicholas Bagger Gurieff, Bagsvaerd (DK)

(73) Assignee: Novozymes A/S, Bagsvaerd (DK)

( * ) Notice: Subject to any disclaimer, the term of this patent is extended or adjusted under 35 U.S.C. 154(b) by 0 days.

(21) Appl. No.: 16/065,938

(22) PCT Filed: Dec. 23, 2016

(86) PCT No.: PCT/CN2016/111738
§ 371 (c)(1),
(2) Date: Jun. 25, 2018

(87) PCT Pub. No.: WO2017/107980
PCT Pub. Date: Jun. 29, 2017

(65) Prior Publication Data
US 2019/0284075 A1    Sep. 19, 2019

Related U.S. Application Data

(60) Provisional application No. 62/271,748, filed on Dec. 28, 2015.

(30) Foreign Application Priority Data

Dec. 23, 2015   (WO) ................ PCT/CN2015/098479

(51) Int. Cl.
| | | |
|---|---|---|
| *C12N 9/00* | (2006.01) | |
| *C02F 11/04* | (2006.01) | |
| *C02F 11/12* | (2019.01) | |
| *C02F 3/34* | (2023.01) | |
| *C02F 3/12* | (2023.01) | |
| *C02F 11/121* | (2019.01) | |
| *C02F 11/147* | (2019.01) | |

(52) U.S. Cl.
CPC .............. *C02F 11/04* (2013.01); *C02F 3/121* (2013.01); *C02F 3/342* (2013.01); *C02F 11/12* (2013.01); *C02F 11/121* (2013.01); *C02F 11/147* (2019.01)

(58) Field of Classification Search
CPC ....................................................... C12N 9/00
See application file for complete search history.

(56) References Cited

U.S. PATENT DOCUMENTS

| | | | | |
|---|---|---|---|---|
| 5,531,898 A | * | 7/1996 | Wickham ................. | C02F 3/34 |
| | | | | 210/606 |
| 6,294,622 B1 | * | 9/2001 | Barajas ..................... | C08F 2/32 |
| | | | | 526/292.2 |
| 2008/0190845 A1 | | 8/2008 | DeLozier et al. | |
| 2014/0308701 A1 | | 10/2014 | Shasky et al. | |

FOREIGN PATENT DOCUMENTS

| | | |
|---|---|---|
| DE | 3713739 A1 | 11/1988 |
| DE | 10249081 A1 | 4/2004 |
| JP | S53-017580 A | 2/1978 |
| JP | S63-116800 A | 5/1988 |
| JP | S63-283800 A | 11/1988 |
| JP | H10-080698 A | 3/1998 |
| WO | 1991010723 A1 | 7/1991 |
| WO | 1999027082 A1 | 6/1999 |
| WO | 2003006602 A2 | 1/2003 |
| WO | 2015128095 A1 | 9/2015 |

OTHER PUBLICATIONS

Parma et al, Enzyme treatment to reduce solids and improve settling of sewage sludge. J Industrial Microbiology & Biotechnology (2001) 26, 383-386.*
Sigma-Aldrich Savinase. Downloaded Jan. 14, 2020.*
Caudan et al, Multiple EPS interactions involved in the cohesion and structure of aerobic granules. Chemosphere 117 (2014) 262-270.*
Novozymes Cellic® CTec3. Downloaded Jan. 16, 2019.*
Higgins et al, Dewatering and settling of activated sludges: The case for using cation analysis. Higgins, Matthew J;Novak, John T Water Environment Research; Mar. 1997; 69, p. 225-232.*
Liu et al, Relationship of Evaluation Indexes of Sludge Dewatering Performance Under different Conditioning Programs. Environmental Science vol. 32 , No. 11 Nov. 2011.*
Liu et al, Relationship of Evaluation Indexes of Sludge Dewatering Performance Under different Conditioning Programs. Environmental Science vol. 32 , No. 11 Nov. 2011. English Translation.*
Karam et al, 1997, J Chem Tech Biotechnol 69(2), 141-153.

* cited by examiner

*Primary Examiner* — Tekchand Saidha
(74) *Attorney, Agent, or Firm* — Eric Fechter

(57) ABSTRACT

The present disclosure relates to enhancing sludge dewaterability by adding cellulase/hemicellulase enzyme mixture and protease to the sludge prior to conventional conditioning and dewatering operations.

20 Claims, 3 Drawing Sheets
Specification includes a Sequence Listing.

SEQUENCE LISTING

```
<160> NUMBER OF SEQ ID NOS: 1

<210> SEQ ID NO 1
<211> LENGTH: 269
<212> TYPE: PRT
<213> ORGANISM: Bacillus lentus

<400> SEQUENCE: 1

Ala Gln Ser Val Pro Trp Gly Ile Ser Arg Val Gln Ala Pro Ala Ala
1               5                   10                  15

His Asn Arg Gly Leu Thr Gly Ser Gly Val Lys Val Ala Val Leu Asp
            20                  25                  30

Thr Gly Ile Ser Thr His Pro Asp Leu Asn Ile Arg Gly Gly Ala Ser
        35                  40                  45

Phe Val Pro Gly Glu Pro Ser Thr Gln Asp Gly Asn Gly His Gly Thr
    50                  55                  60

His Val Ala Gly Thr Ile Ala Ala Leu Asn Asn Ser Ile Gly Val Leu
65                  70                  75                  80

Gly Val Ala Pro Ser Ala Glu Leu Tyr Ala Val Lys Val Leu Gly Ala
                85                  90                  95

Ser Gly Ser Gly Ser Val Ser Ser Ile Ala Gln Gly Leu Glu Trp Ala
            100                 105                 110

Gly Asn Asn Gly Met His Val Ala Asn Leu Ser Leu Gly Ser Pro Ser
        115                 120                 125

Pro Ser Ala Thr Leu Glu Gln Ala Val Asn Ser Ala Thr Ser Arg Gly
    130                 135                 140

Val Leu Val Val Ala Ala Ser Gly Asn Ser Gly Ala Gly Ser Ile Ser
145                 150                 155                 160

Tyr Pro Ala Arg Tyr Ala Asn Ala Met Ala Val Gly Ala Thr Asp Gln
                165                 170                 175

Asn Asn Asn Arg Ala Ser Phe Ser Gln Tyr Gly Ala Gly Leu Asp Ile
            180                 185                 190

Val Ala Pro Gly Val Asn Val Gln Ser Thr Tyr Pro Gly Ser Thr Tyr
        195                 200                 205
```

-continued

```
Ala Ser Leu Asn Gly Thr Ser Met Ala Thr Pro His Val Ala Gly Ala
    210                 215                 220

Ala Ala Leu Val Lys Gln Lys Asn Pro Ser Trp Ser Asn Val Gln Ile
225                 230                 235                 240

Arg Asn His Leu Lys Asn Thr Ala Thr Ser Leu Gly Ser Thr Asn Leu
                245                 250                 255

Tyr Gly Ser Gly Leu Val Asn Ala Glu Ala Ala Thr Arg
            260                 265
```

METHODS FOR ENHANCING THE DEWATERABILITY OF SLUDGE WITH ENZYME TREATMENT

CROSS-REFERENCE TO RELATED APPLICATIONS

This application is a 35 U.S.C. 371 national application of PCT/CN2016/111738, filed Dec. 23, 2016, which claims priority or the benefit under 35 U.S.C. 119 of International application no. PCT/CN2015/098479, filed Dec. 23, 2015. The contents of these applications are fully incorporated herein by reference.

REFERENCE TO SEQUENCE LISTING

This application contains a Sequence Listing in computer readable form, which is incorporated herein by reference.

FIELD OF THE INVENTION

The present invention relates to methods for enhancing the dewaterability of residuals (i.e., sludge) generated by conventional wastewater treatment operations.

BACKGROUND OF THE INVENTION

Sludge, generated during the course of conventional wastewater treatment, is usually dewatered or concentrated prior to disposal by incineration, land application, land filling, composting, etc. A basic dewatering scenario involves forming strong, shear-resistant sludge flocs through the addition of a conditioning agent such as ferric sulphate and/or a flocculating agent (e.g., polyelectrolyte) followed by mechanical solid/liquid separation across gravity belt thickeners, belt filter presses, or centrifuges. By dewatering sludge, the wastewater treatment plant (WWTP) enhances the amount of solids per volumetric unit of sludge (i.e., cake solids) that ultimately must be disposed of. The benefits of higher cake solids include: reduced dewatered sludge volume (less sludge to be "managed" by the plant); lower annual transportation costs (shipping the sludge to landfills or sites of land application); less water to be evaporated before sludge can be incinerated (increasing the net energy value of the sludge when incineration is used for cogeneration purposes); a more concentrated feed to digesters; and/or reduced volume of sludge to be landfilled or land applied.

The generic composition of sludge is generally about 90-99% water, the remaining portion being total solids, with actual cell mass (i.e., bacterial cells) representing approximately 10% of the total solids. The remaining 90% of the total solids consists of extracellular polymeric substance (EPS) which forms a hydrated matrix within which the bacterial cells are dispersed. Sludge dewaterability, regardless of the means used to generate the sludge, has been largely associated with the EPS fraction of the whole sludge. EPS is comprised of debris from cell lysis (e.g., nucleic acid, lipids/phospholipids, protein, etc.), actively secreted extracellular products (e.g., polysaccharides and proteins), products of extracellular, EPS-bound enzymatic activity (e.g., polysaccharides), adsorbed material from the wastewater (e.g., humic substances, multivalent cations). Due to this complex nature of EPS and the predominant presence of polysaccharides and protein, EPS is traditionally characterized by the ratio of carbohydrates to proteins ($EPS_{carb:prot}$). While the $EPS_{carb:prot}$ can vary from primary sludge to primary sludge depending on numerous operational parameters of the WWTP, the EPS composition within secondary sludges is somewhat more digestion specific: anaerobically digested sludge $EPS_{carb:prot}$ tends to be less than unity while aerobically digested sludge $EPS_{carb:prot}$ is greater than unity. In any case, these primary components are considered to be the key hydratable substances within sludge flocs that effectively bind water and resist dewatering.

Methods which disrupt the water-binding capacity and/or mechanical integrity of sludge flocs are believed to enhance the dewaterability of the whole sludge upon polymeric flocculation. Most of such methods have focused on the ability of novel chemistries (e.g., acid pre-treatment, multivalent cationic conditioners) and processes (high temperature pre-treatment, electric discharge, sonication) to disrupt EPS components and improve dewaterability. A number of papers exist describing the use of enzymes for selective hydrolysis within the EPS to reduce the sludge volume, with varying results. See e.g., DE 10249081, WO 91/10723, and DE 3713739.

Prior art of interest includes U.S. Patent Publication No. US 2008/0190845 (herein incorporated by reference in its entirety) to DeLozier et al. relating to methods for enhancing the dewaterability of residuals (i.e., sludge) generated by conventional wastewater treatment operations. WO 99/27082 and WO 2003/006602 (both herein incorporated by reference in their entirety) are of interest as they relate to proteases and variants thereof.

As sludge remains problematic and dewatering difficult, there is a continuous need to improve methods for enhancing the dewaterability of residuals (i.e., sludge) generated by conventional wastewater treatment operations.

SUMMARY OF THE INVENTION

The present disclosure relates to methods for enhancing the dewaterability of sludge including contacting or treating sludge with an enzyme and compositions thereof including a cellulase and protease. In a preferred embodiment, the disclosure relates to methods for enhancing the dewaterability of sludge including treating the sludge with an enzyme composition including Novozymes Cellic® CTec3 brand enzyme composition from Novozymes A/S (Bagsvaerd, DK) and a protease such as SAVINASE brand protease from Novozymes A/S (Bagsvaerd, DK). In embodiments, the present disclosure relates to methods for enhancing the dewaterability of sludge including contacting the sludge with an enzyme composition including and effective amount of Cellic® CTec3 brand enzyme composition from Novozymes A/S (Bagsvaerd, DK) and an effective/supplemental amount of protease. A non-limiting example of protease includes SAVINASE brand enzyme (Novozymes A/S, Bagsvaerd, DK).

In yet another embodiment, the treatment includes an enzyme composition including at least one additional enzyme, such as a cellulase, a hemicellulase, an endoglucanase, a cellobiohydrolase, a beta-glucosidase, a xylanase, or a beta-xylosidase.

The enzyme treatment is preferably added prior to sludge conditioning (i.e., prior to coagulation and/or flocculation) and mechanical dewatering. In embodiments, enzyme and compositions thereof in accordance with the present disclosure is applied to municipal sludge to aid in subsequent mechanical dewatering, resulting in lower sludge volumes, and/or reduced use of polymers used in dewatering process.

In embodiments, the active enzymes in compositions of the present disclosure include Cellic® CTec3 brand enzyme composition and protease constituent. Compositions of the present disclosure surprisingly enhance the dewaterability of residuals compared to enzymes applied alone under similar conditions. In embodiments, a method for enhancing the dewaterability of sludge is disclosed including the step of contacting or adding Cellic® CTec3 brand enzyme composition and protease to digested sludge such as anaerobically or aerobically digested sludge.

In embodiments, suitable cellulase and cellulase/hemicellulase mixtures for use in accordance with the present disclosure are described in WO 2013/028928 (herein incorporated by reference in its entirety). Suitable enzyme compositions for use in accordance with the present disclosure include *Aspergillus fumigatus* cellobiohydrolase I, *Aspergillus fumigatus* cellobiohydrolase II, an *Aspergillus fumigatus* beta-glucosidase or variant thereof, *Penicillium* sp. (emersonii) GH61 polypeptide having cellulolytic enhancing activity, *Aspergillus fumigatus* xylanase, or *Aspergillus fumigatus* beta-xylosidase, or homologs thereof, may be used.

In embodiments, the dose of cellulase or cellulase/hemicellulase enzyme mixture is between 10 and 2000 g per dry ton of total suspended solids and the dose of the protease is between 10 and 2000 g per dry ton of total suspended solids. In embodiments, the dose of cellulase or cellulase/hemicellulase mixture is between 10 and 1000 g per dry ton of total suspended solids and the dose of the protease is between 10 and 1000 g per dry ton of total suspended solids. In embodiments, the dose of cellulase cellulase/hemicellulase mixture is between 50 and 500 g per dry ton of total suspended solids and the dose of the protease is between 50 and 500 g per dry ton of total suspended solids. In embodiments, the dose of cellulase or cellulase/hemicellulase mixture is between 100 and 500 g per dry ton of total suspended solids. In embodiments, the dose of cellulase or cellulase/hemicellulase mixture is between 100 and 500 g per dry ton of total suspended solids and the dose of the protease is between 100 and 500 g per dry ton of total suspended solids. As used herein, the amounts in g per dry ton of total suspended solids refers to the amount of enzyme product applied in grams.

In embodiments, the cellulase or cellulase/hemicellulase enzyme mixture and protease enzyme contact the sludge under conditions that incubate the sludge for 1 minute to 96 hours at a temperature of 20-60° C. In embodiments, the cellulase or cellulase/hemicellulase enzyme mixture and protease enzyme incubate with the sludge for 16-72 hours, and in embodiments, for 1 to 3 days.

In embodiments, suitable sludge for use in accordance with the present disclosure is generated during conventional municipal and industrial wastewater treatment operations, including tertiary or digested sludge.

In embodiments, the cellulase or cellulase/hemicellulase enzyme mixture are contacted with the sludge in combination with a protease. In embodiments, the active enzymes include a protease such as protease having at least 80% sequence identity to the protease shown in SEQ ID NO: 1. In embodiments, the protease has at least 90% sequence identity to SEQ ID NO:1. In embodiments, the protease has at least 95% sequence identity to SEQ ID NO: 1. In embodiments, the protease has at least 96% sequence identity to SEQ ID NO: 1. In embodiments, the protease has at least 97% sequence identity to SEQ ID NO: 1. In embodiments, the protease has at least 98% sequence identity to SEQ ID NO: 1. In embodiments, the protease has at least 99% sequence identity to SEQ ID NO: 1. In embodiments, the protease comprises or consists of the protease shown in SEQ ID NO: 1. In embodiments, the protease is the mature form of the protease shown in SEQ ID NO: 1 or functional fragments thereof.

In embodiments, the present disclosure relates to a method of treating sludge including:

(a) contacting sludge with cellulase or cellulase/hemicellulase enzyme mixture and protease having at least 90% sequence identity to SEQ ID NO: 1; and (b) removing water from the sludge. Embodiments further include adding a dose of cellulase or cellulase/hemicellulase enzyme mixture in an amount of 10 and 2000 g per dry ton of total suspended solids and a dose of the protease in an amount of 10 and 2000 g per dry ton of total suspended solids. In embodiments, the dose of cellulase or cellulase/hemicellulase mixture is in an amount of 10 and 1000 g per dry ton of total suspended solids and the dose of the protease is in an amount of 10 and 1000 g per dry ton of total suspended solids. In embodiments, incubating the cellulase or cellulase/hemicellulase mixture and protease enzyme occurs under suitable temperature such as 20-60° C. for a sufficient duration such as for 1 minute to 96 hours.

As used herein the terms "Family 61 glycoside hydrolase" or "Family GH61" or "GH61" means a polypeptide falling into the glycoside hydrolase Family 61 according to Henrissat, 1991, A classification of glycosyl hydrolases based on amino-acid sequence similarities, *Biochem. J.* 280: 309-316, and Henrissat and Bairoch, 1996, Updating the sequence-based classification of glycosyl hydrolases, *Biochem. J.* 316: 695-696. The enzymes in this family were originally classified as a glycoside hydrolase family based on measurement of very weak endo-1,4-beta-D-glucanase activity in one family member. The structure and mode of action of these enzymes are non-canonical and they cannot be considered as bona fide glycosidases. However, they are kept in the CAZy classification on the basis of their capacity to enhance the breakdown of lignocellulose when used in conjunction with a cellulase or a mixture of cellulases.

As used herein the term "fragment" means a polypeptide having one or more (e.g., several) amino acids absent from the amino and/or carboxyl terminus of a mature polypeptide; wherein the fragment has activity as the mature polypeptide thereof.

As used herein the terms "hemicellulolytic enzyme" or "hemicellulase" means one or more (e.g., several) enzymes that hydrolyze a hemicellulosic material. See, for example, Shallom and Shoham, 2003, Microbial hemicellulases, *Current Opinion In Microbiology* 6(3): 219-228). Examples of hemicellulases include, but are not limited to, an acetylmannan esterase, an acetylxylan esterase, an arabinanase, an arabinofuranosidase, a coumaric acid esterase, a feruloyl esterase, a galactosidase, a glucuronidase, a glucuronoyl esterase, a mannanase, a mannosidase, a xylanase, and a xylosidase. The substrates of these enzymes, the hemicelluloses, are a heterogeneous group of branched and linear polysaccharides that are bound via hydrogen bonds to the cellulose microfibrils in the plant cell wall, crosslinking them into a robust network. Hemicelluloses are also covalently attached to lignin, forming together with cellulose a highly complex structure. The variable structure and organization of hemicelluloses require the concerted action of many enzymes for its complete degradation. The catalytic modules of hemicellulases are either glycoside hydrolases (GHs) that hydrolyze glycosidic bonds, or carbohydrate esterases (CEs), which hydrolyze ester linkages of acetate or ferulic acid side groups. These catalytic modules, based on homology of their primary sequence, can be assigned into GH and CE families. Some families, with an overall similar fold, can be further grouped into clans, marked alphabetically (e.g., GH-A). A most informative and updated classification of these and other carbohydrate active enzymes is available in the Carbohydrate-Active Enzymes (CAZy) database. Hemicellulolytic enzyme activities can be measured according to Ghose and Bisaria, 1987, *Pure & Appl. Chem.* 59: 1739-1752, at a suitable temperature, e.g., 50° C., 55° C., or 60° C., and pH, e.g., 5.0 or 5.5.

As used herein term "mature polypeptide" means a polypeptide in its final form following translation and any post-translational modifications, such as N-terminal processing, C-terminal truncation, glycosylation, phosphorylation, etc. It is known in the art that a host cell may produce a mixture of two of more different mature polypeptides (i.e., with a different C-terminal and/or N-terminal amino acid) expressed by the same polynucleotide. It is also known in the art that different host cells process polypeptides differently, and thus, one host cell expressing a polynucleotide may produce a different mature polypeptide (e.g., having a different C-terminal and/or N-terminal amino acid) as compared to another host cell expressing the same polynucleotide.

As used herein the term "polypeptide having cellulolytic enhancing activity" means a GH61 polypeptide that catalyzes the enhancement of the hydrolysis of a cellulosic material by enzyme having cellulolytic activity. For purposes of the present disclosure, cellulolytic enhancing activity is determined by measuring the increase in reducing sugars or the increase of the total of cellobiose and glucose from the hydrolysis of a cellulosic material by cellulolytic enzyme under the following conditions: 1-50 mg of total protein/g of cellulose in PCS, wherein total protein is comprised of 50-99.5% w/w cellulolytic enzyme protein and 0.5-50% w/w protein of a GH61 polypeptide having cellulolytic enhancing activity for 1-7 days at a suitable temperature, e.g., 50° C., 55° C., or 60° C., and pH, e.g., 5.0 or 5.5, compared to a control hydrolysis with equal total protein loading without cellulolytic enhancing activity (1-50 mg of cellulolytic protein/g of cellulose in PCS). In a preferred aspect, a mixture of CELLUCLAST®1.5 L (Novozymes A/S, Bagsvaerd, Denmark) in the presence of 2-3% of total protein weight *Aspergillus oryzae* beta-glucosidase (recombinantly produced in *Aspergillus oryzae* according to WO 02/095014) or 2-3% of total protein weight *Aspergillus fumigatus* beta-glucosidase (recombinantly produced in *Aspergillus oryzae* as described in WO 02/095014) of cellulase protein loading is used as the source of the cellulolytic activity.

The GH61 polypeptides having cellulolytic enhancing activity enhance the hydrolysis of a cellulosic material catalyzed by enzyme having cellulolytic activity by reducing the amount of cellulolytic enzyme required to reach the same degree of hydrolysis preferably at least 1.01-fold, e.g., at least 1.05-fold, at least 1.10-fold, at least 1.25-fold, at least 1.5-fold, at least 2-fold, at least 3-fold, at least 4-fold, at least 5-fold, at least 10-fold, or at least 20-fold.

Sequence identity: The relatedness between two amino acid sequences or between two nucleotide sequences is described by the parameter "sequence identity". For purposes of the present disclosure, the sequence identity between two amino acid sequences is determined using the Needleman-Wunsch algorithm (Needleman and Wunsch, 1970, *J. Mol. Biol.* 48: 443-453) as implemented in the Needle program of the EMBOSS package (EMBOSS: The European Molecular Biology Open Software Suite, Rice et al., 2000, *Trends Genet.* 16: 276-277), preferably version 5.0.0 or later. The parameters used are gap open penalty of 10, gap extension penalty of 0.5, and the EBLOSUM62 (EMBOSS version of BLOSUM62) substitution matrix. The output of Needle labeled "longest identity" (obtained using the -nobrief option) is used as the percent identity and is calculated as follows: (Identical Residues·times·100)/ (Length of Alignment-Total Number of Gaps in Alignment).

For purposes of the present disclosure, the sequence identity between two deoxyribonucleotide sequences is determined using the Needleman-Wunsch algorithm (Needleman and Wunsch, 1970, supra) as implemented in the Needle program of the EMBOSS package (EMBOSS: The European Molecular Biology Open Software Suite, Rice et al., 2000, supra), preferably version 5.0.0 or later. The parameters used are gap open penalty of 10, gap extension penalty of 0.5, and the EDNAFULL (EMBOSS version of NCBI NUC4.4) substitution matrix. The output of Needle labeled "longest identity" (obtained using the -nobrief option) is used as the percent identity and is calculated as follows: (Identical Deoxyribonucleotides·times·100)/ (Length of Alignment-Total Number of Gaps in Alignment).

As used herein the term "variant" means a polypeptide having enzyme activity comprising an alteration, i.e., a substitution, insertion, and/or deletion, at one or more (e.g., several) positions. A substitution means replacement of the amino acid occupying a position with a different amino acid; a deletion means removal of the amino acid occupying a position; and an insertion means adding an amino acid adjacent to and immediately following the amino acid occupying a position.

As used herein a "xylanase" means a 1,4-beta-D-xylan-xylohydrolase (E.C. 3.2.1.8) that catalyzes the endohydrolysis of 1,4-beta-D-xylosidic linkages in xylans. For purposes of the present disclosure, xylanase activity is determined with 0.2% AZCL-arabinoxylan as substrate in 0.01% TRITON®. X-100 and 200 mM sodium phosphate buffer pH 6 at 37° C. One unit of xylanase activity is defined as 1.0 mmole of azurine produced per minute at 37° C., pH 6 from 0.2% AZCL-arabinoxylan as substrate in 200 mM sodium phosphate pH 6 buffer.

DETAILED DESCRIPTION OF PREFERRED EMBODIMENTS

Figure 1:
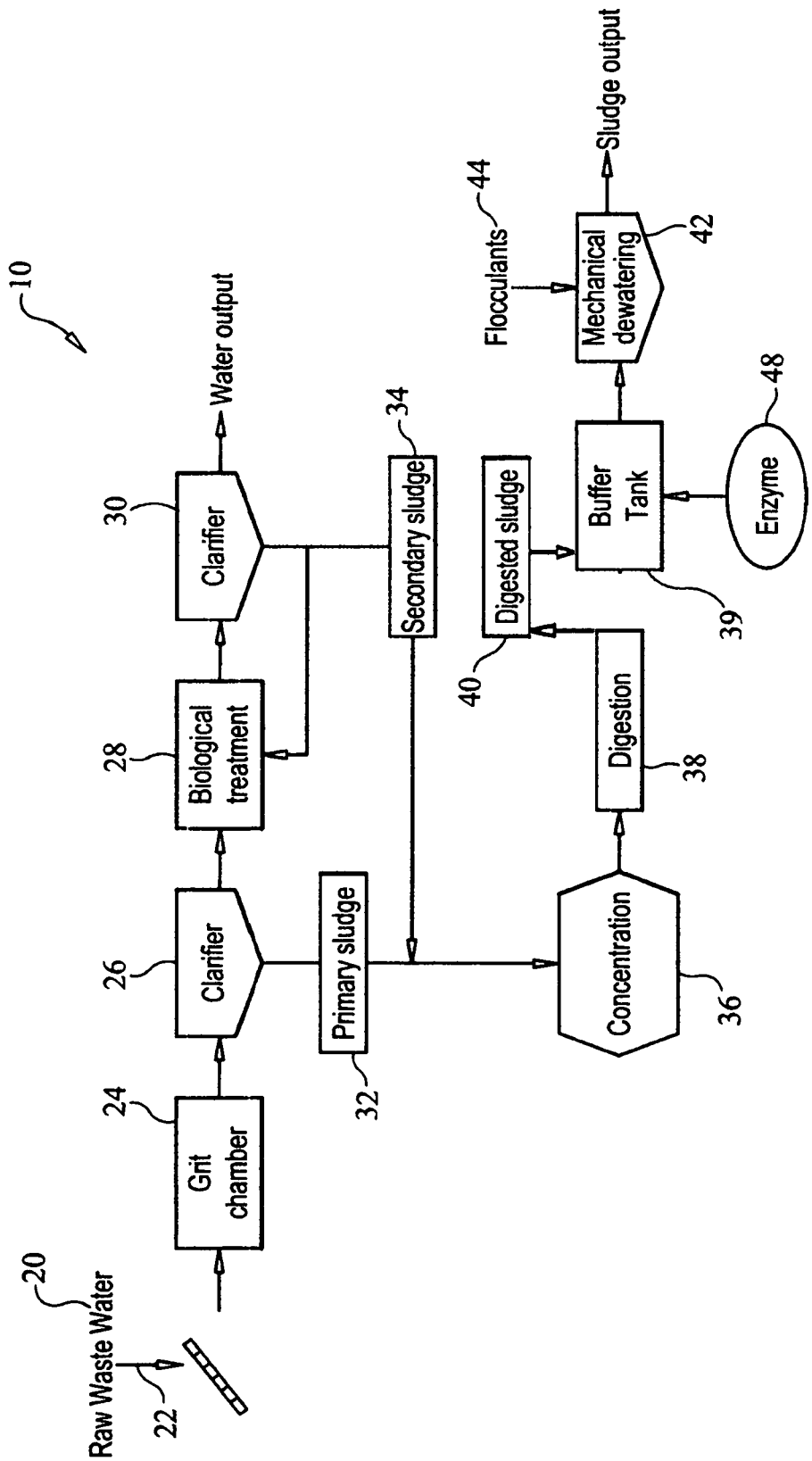
FIG. 1 is a schematic view of wastewater treatment in accordance with the present disclosure.

The present disclosure relates to an enzymatic method to facilitate and/or improve the process of dewatering sludge, such as, sludge generated during conventional wastewater treatment.

The various processes to treat industrial and municipal wastewater often generate sludge as a by-product of proper operation. Sludges generated by the wastewater treatment industry are classified not only by the source of wastewater (e.g., municipal or industrial) but also by specific stages of the wastewater treatment process. In the broadest classification, sludge is considered primary, secondary or tertiary. Primary sludges are usually considered "raw" as they are often the result of settling of solids from raw wastewater influent passed across primary clarifiers. In most instances, the clarified water is then sent to activated sludge basins (ASBs) in which suspended flocs of microorganisms remove soluble contaminants from the water. As the microorganisms replicate, they must be periodically removed from the ASB to avoid overgrowth. Their removal takes place at a secondary clarifier receiving influent from the ASB. This "secondary sludge" is considered "waste activated sludge" (WAS) and has a relatively universal presence at WWTPs employing biological nutrient removal (BNR) systems. To reduce the volume of (and stabilize) this secondary sludge, the sludge may be sent to aerobic (ambient aeration or pure oxygen) or anaerobic digesters which may be operated under either mesophilic or thermophilic conditions. The resultant "tertiary" sludge is then known as "digested sludge" and may be further classified according to the specifics of digestion (e.g., thermophilic aerobically digested sludge). So, as can be seen, innumerable sludge types are produced during the treatment of wastewater. However, they can be loosely grouped as:

1. Primary or raw sludge;
2. Secondary or waste activated sludge; and
3. Tertiary, stabilized or digested sludge.

Regardless of the means by which it was generated, sludge produced during wastewater treatment operations, usually employing some means of biological nutrient removal, will contain substances that serve as substrates for enzymatic hydrolysis. In most instances, this substrate is present as a component of the extracellular polymeric substances (EPS) that comprise the majority of the sludge solids. The composition of EPS varies from sludge to sludge depending upon a number of variables including the nature of the wastewater to be treated, the treatment process employed and the treatment conditions. Specific monosaccharides (e.g., glucose, mannose, galactose, etc.) tend to be universally present within sludge EPS. Considering this, although the overall composition of the EPS of sludge(s) may differ greatly, there is some degree of similarity in the type of glycosidic linkages present in the sludge components.

According to the present disclosure, cellulase or cellulase/hemicellulase enzyme mixture and protease described herein can be applied to all sludge(s) associated with conventional wastewater treatment specifically to improve dewaterability. In a preferred embodiment, the cellulase or cellulase/hemicellulase enzyme mixture and protease enzymes and compositions thereof are applied to tertiary sludge(s) generated during treatment of industrial and municipal waste water. In embodiments, the cellulase or cellulase/hemicellulase enzyme mixture and protease and compositions of the present disclosure are applied to digested sludge form such as anaerobically or aerobically digested sludge. A purpose of the present disclosure is to facilitate or improve the process of sludge dewatering including treating sludge with a combination of cellulase or cellulase/hemicellulase enzyme mixture and protease, prior to conventional sludge conditioning and dewatering operations.

The process to enhance the dewaterability of sludge according to the present disclosure comprises or consists of the following steps:
 a) generating or obtaining sludge, such as, during conventional wastewater treatment;
 b) treating the sludge with a cellulase enzyme or cellulase/hemicellulase enzyme mixture and protease enzyme in accordance with the present disclosure;
 c) optionally, conditioning the sludge with coagulating and/or flocculating additives;
 d) dewatering the enzyme treated sludge with conventional equipment.

In addition to above steps further optional steps may be included, such as, for example, treating the sludge with enzymes post digestion and before dewatering stages. In embodiments, enzyme composition of the present disclosure is contacted with sludge before mechanical dewatering of sludge in the waste water process stream.

In one aspect, the cellulase or or cellulase/hemicellulase enzyme mixture of the present disclosure includes one or more (e.g., several) proteins selected from the group consisting of a cellulase, a GH61 polypeptide having cellulolytic enhancing activity, and a hemicellulase. In embodiments protease is added to the process stream at the same time, or in combination with the cellulase or or cellulase/hemicellulase enzyme mixture.

In embodiments, the cellulase is one or more (e.g., several) enzymes selected from the group consisting of an endoglucanase, a cellobiohydrolase, and a beta-glucosidase.

In embodiments, the hemicellulase is one or more (e.g., several) enzymes selected from the group consisting of an acetylmannan esterase, an acetylxylan esterase, an arabinanase, an arabinofuranosidase, a coumaric acid esterase, a feruloyl esterase, a galactosidase, a glucuronidase, a glucuronoyl esterase, a mannanase, a mannosidase, a xylanase, and a xylosidase.

In embodiments, the cellulase or or cellulase/hemicellulase enzyme mixture or enzyme composition includes one or more (e.g., several) cellulolytic enzymes. In another aspect, the enzyme composition comprises or further comprises one or more (e.g., several) hemicellulolytic enzymes. In another aspect, the enzyme composition comprises one or more (e.g., several) cellulolytic enzymes and one or more (e.g., several) hemicellulolytic enzymes. In another aspect, the enzyme composition comprises one or more (e.g., several) enzymes selected from the group of cellulolytic enzymes and hemicellulolytic enzymes. In another aspect, the enzyme composition comprises an endoglucanase. In another aspect, the enzyme composition comprises a cellobiohydrolase. In another aspect, the enzyme composition comprises a beta-glucosidase. In another aspect, the enzyme composition comprises a polypeptide having cellulolytic enhancing activity. In another aspect, the enzyme composition comprises an endoglucanase and a polypeptide having cellulolytic enhancing activity. In another aspect, the enzyme composition comprises a cellobiohydrolase and a polypeptide having cellulolytic enhancing activity. In another aspect, the enzyme composition comprises a beta-glucosidase and a polypeptide having cellulolytic enhancing activity. In another aspect, the enzyme composition comprises an endoglucanase and a cellobiohydrolase. In another aspect, the enzyme composition comprises an endoglucanase and a beta-glucosidase. In another aspect, the enzyme composition comprises a cellobiohydrolase and a beta-glucosidase. In another aspect, the enzyme composition comprises an endoglucanase, a cellobiohydrolase, and a polypeptide having cellulolytic enhancing activity. In another aspect, the enzyme composition comprises an endoglucanase, a beta-glucosidase, and a polypeptide having cellulolytic enhancing activity. In another aspect, the enzyme composition comprises a cellobiohydrolase, a beta-glucosidase, and a polypeptide having cellulolytic enhancing activity. In another aspect, the enzyme composition comprises an endoglucanase, a cellobiohydrolase, and a beta-glucosidase. In another aspect, the enzyme composition comprises an endoglucanase, a cellobiohydrolase, a beta-glucosidase, and a polypeptide having cellulolytic enhancing activity.

In another aspect, the enzyme composition comprises a galactosidase (e.g., alpha-galactosidase and/or beta-galactosidase). In another aspect, the enzyme composition comprises a xylanase. In a preferred aspect, the xylanase is a Family 10 xylanase. In another aspect. the enzyme composition comprises an *Aspergillus fumigatus* GH10 xylanase such as disclosed in WO 2006/078256 (herein incorporated by reference in its entirety). In another aspect, the enzyme composition comprises a xylosidase (e.g., beta-xylosidase). In another aspect. the enzyme composition comprises *Aspergillus fumigatus* beta-xylosidase such as disclosed in WO 2011/057140 (herein incorporated by reference in its entirety).

One or more (e.g., several) components of the enzyme composition may be wild-type proteins, recombinant proteins, or a combination of wild-type proteins and recombinant proteins. For example, one or more (e.g., several) components may be native proteins of a cell, which is used as a host cell to express recombinantly one or more (e.g., several) other components of the enzyme composition. One or more (e.g., several) components of the enzyme composition may be produced as monocomponents, which are then combined to form the enzyme composition. The enzyme composition may be a combination of multicomponent and monocomponent protein preparations.

The enzymes used in the methods of the present disclosure may be in any form suitable for use, such as, for example, a fermentation broth formulation or a cell composition, a cell lysate with or without cellular debris, a semi-purified or purified enzyme preparation, or a host cell as a source of the enzymes. The enzyme composition may be a dry powder or granulate, a non-dusting granulate, a liquid, a stabilized liquid, or a stabilized protected enzyme. Liquid enzyme preparations may, for instance, be stabilized by adding stabilizers such as a sugar, a sugar alcohol or another polyol, and/or lactic acid or another organic acid according to established processes.

In embodiments, polypeptides having cellulolytic enzyme activity or hemicellulolytic enzyme activity are suitable for use in accordance with the present disclosure including, e.g., GH61 polypeptides having cellulolytic enhancing activity, which can be derived or obtained from any suitable origin, including, bacterial, fungal, yeast, plant, or mammalian origin. The term "obtained" also means herein that the enzyme may have been produced recombinantly in a host organism employing methods described herein, wherein the recombinantly produced enzyme is either native or foreign to the host organism or has a modified amino acid sequence, e.g., having one or more (e.g., several) amino acids that are deleted, inserted and/or substituted, i.e., a recombinantly produced enzyme that is a mutant and/or a fragment of a native amino acid sequence or an enzyme produced by nucleic acid shuffling processes known in the art. Encompassed within the meaning of a native enzyme are natural variants and within the meaning of a foreign enzyme are variants obtained recombinantly.

In embodiments, the one or more (e.g., several) cellulase or cellulase/hemicellulase mixtures include a commercial cellulolytic enzyme preparation. Examples of commercial cellulolytic enzyme preparations suitable for use in the present disclosure include, for example, CELLIC® CTec (Novozymes A/S), CELLIC® CTec2 (Novozymes A/S), CELLIC® CTec3 (Novozymes A/S), CELLUCLAST™ (Novozymes A/S), NOVOZYM™ 188 (Novozymes A/S), CELLUZYME™ (Novozymes A/S), CEREFLO™ (Novozymes A/S), and ULTRAFLO™ (Novozymes A/S), ACCELERASE™ (Genencor Int.), LAMINEX™ (Genencor Int.), SPEZYME™ CP (Genencor Int.), FILTRASE® NL (DSM); METHAPLUS® S/L 100 (DSM), ROHAMENT™ 7069 W (Rohm GmbH), FIBREZYME® LDI (Dyadic International, Inc.), FIBREZYME® LBR (Dyadic International, Inc.), or VISCOSTAR® 150 L (Dyadic International, Inc.). The cellulase enzymes are added in amounts effective from about 0.005 wt % of solids, e.g., about 0.01 wt % of solids or about 0.1 wt % of solids. The cellulase enzymes are added in amounts effective from about 0.005 to 0.1 wt % of solids.

Examples of cellobiohydrolases useful in the present disclosure include, but are not limited to, *Aspergillus aculeatus* cellobiohydrolase II (WO 2011/059740 herein incorporated by reference), *Aspergillus fumigatus* cellobiohydrolase I (WO 2011/057140 herein incorporated by reference), *Aspergillus fumigatus* cellobiohydrolase II (WO 2011/057140 herein incorporated by reference), *Chaetomium thermophilum* cellobiohydrolase I, *Chaetomium thermophilum* cellobiohydrolase II, *Humicola insolens* cellobiohydrolase I, *Myceliophthora thermophila* cellobiohydrolase II (WO 2009/042871 herein incorporated by reference), *Thielavia hyrcanie* cellobiohydrolase II (WO 2010/141325), *Thielavia terrestris* cellobiohydrolase II (CEL6A, WO 2006/074435), *Trichoderma reesei* cellobiohydrolase I, *Trichoderma reesei* cellobiohydrolase II, and *Trichophaea saccata* cellobiohydrolase II (WO 2010/057086).

Examples of beta-glucosidases useful in the present disclosure include, but are not limited to, beta-glucosidases from *Aspergillus aculeatus* (Kawaguchi et al., 1996, *Gene* 173: 287-288), *Aspergillus fumigatus* (WO 2005/047499 herein incorporated by reference), *Aspergillus fumigatus* beta-glucosidase variant (WO 2012/044915 herein incorporated by reference), *Aspergillus niger* (Dan et al., 2000, *J. Biol. Chem.* 275: 4973-4980), *Aspergillus oryzae* (WO 2002/095014), *Penicillium brasilianum* IBT 20888 (WO 2007/019442 and WO 2010/088387 herein incorporated by reference), *Thielavia terrestris* (WO 2011/035029 herein incorporated by reference), and *Trichophaea saccata* (WO 2007/019442 herein incorporated by reference).

The beta-glucosidase may be a fusion protein. In one aspect, the beta-glucosidase is an *Aspergillus oryzae* beta-glucosidase variant BG fusion protein (WO 2008/057637) or an *Aspergillus oryzae* beta-glucosidase fusion protein (WO 2008/057637).

Other useful endoglucanases, cellobiohydrolases, and beta-glucosidases are disclosed in numerous Glycosyl Hydrolase families using the classification according to Henrissat B., 1991, A classification of glycosyl hydrolases based on amino-acid sequence similarities, *Biochem. J.* 280: 309-316, and Henrissat and Bairoch, 1996, Updating the sequence-based classification of glycosyl hydrolases, *Biochem. J.* 316: 695-696.

In one aspect, the one or more (e.g., several) hemicellulolytic enzymes for use in accordance with the present disclosure include a commercial hemicellulolytic enzyme preparation. Examples of commercial hemicellulolytic enzyme preparations suitable for use in the present disclosure include, for example, SHEARZYME™ (Novozymes A/S), CELLIC® HTec (Novozymes A/S), CELLIC® HTec2 (Novozymes A/S), CELLIC® HTec3 (Novozymes A/S), VISCOZYME® (Novozymes A/S), ULTRAFLO® (Novozymes A/S), PULPZYME® HC (Novozymes A/S), MULTIFECT® Xylanase (Genencor), ACCELLERASE® XY (Genencor), ACCELLERASE® XC (Genencor), ECOPULP® TX-200A (AB Enzymes), HSP 6000 Xylanase (DSM), DEPOL™ 333P (Biocatalysts Limit, Wales, UK), DEPOL™ 740L. (Biocatalysts Limit, Wales, UK), and DEPOL™ 762P (Biocatalysts Limit, Wales, UK).

Examples of xylanases useful in the methods of the present disclosure include, but are not limited to, xylanases from *Aspergillus aculeatus* (GeneSeqP:AAR63790; WO 94/21785), *Aspergillus fumigatus* (WO 2006/078256 herein incorporated by reference), *Penicillium pinophilum* (WO 2011/041405 herein incorporated by reference), *Penicillium* sp. (WO 2010/126772), *Thielavia terrestris* NRRL 8126 (WO 2009/079210), and *Trichophaea saccata* GH10 (WO 2011/057083).

Examples of beta-xylosidases useful in the methods of the present disclosure include, but are not limited to, beta-xylosidases from *Aspergillus fumigatus* beta-xylosidase (WO 2011/057140), *Neurospora crassa* (SwissProt accession number Q7SOW4), *Trichoderma reesei* (UniProtKB/TrEMBL accession number Q92458), and *Talaromyces emersonii* (SwissProt accession number Q8X212).

In embodiments, suitable cellulase and cellulase/hemicellulase mixtures for use in accordance with the present disclosure are described in WO 2013/028928 (herein incorporated by reference in its entirety). Suitable enzyme compositions for use in accordance with the present disclosure include *Aspergillus fumigatus* cellobiohydrolase I, *Aspergillus fumigatus* cellobiohydrolase II, an *Aspergillus fumigatus* beta-glucosidase or variant thereof, *Penicillium* sp. (emersonii) GH61 polypeptide having cellulolytic enhancing activity, *Aspergillus fumigatus* xylanase, or *Aspergillus fumigatus* beta-xylosidase, or homologs thereof, may be used.

In embodiments, the cellulase or cellulase/hemicellulase enzyme mixture is applied in amounts effective to facilitate or improve the process of sludge dewatering comprising contacting or treating sludge with cellulase or cellulase/hemicellulase enzyme mixture, preferably, prior to conventional sludge conditioning and dewatering operations such as concentration and mechanical dewatering steps. Examples of suitable amounts include 10 to 2000 g protein per kg of total suspended solids, 10 to 1000 g of protein per kg of total suspended solids, 50 to 500 g of protein per kg of total suspended solids, 100 to 500 g of protein per kg of total suspended solids.

In embodiments, CELLIC® CTec3 (Novozymes A/S), is applied at 0.01-2 kg per dry ton of sludge solids. In embodiments, CELLIC® CTec3 (Novozymes A/S), is applied at 0.1-1 kg per dry ton of sludge solids. In embodiments, CELLIC® CTec3 (Novozymes A/S), is applied at 0.5 kg per dry ton of sludge solids. In embodiments, CELLIC® CTec3 (Novozymes A/S), is applied at suitable amounts including 0.002 to 0.4 g protein per kg of total suspended solids, 0.002 to 0.2 g of protein per kg of total suspended solids, 0.01 to 0.1 g of protein per kg of total suspended solids, 0.02 to 0.1 g of protein per kg of total suspended solids.

The cellulase or cellulase/hemicellulose enzyme mixture may be applied under conditions suitable to the sludge processing conditions, such as, for example, temperatures from 20 to 60° C., pH conditions from 4 to 10, and for a treatment time of 1 to 100 hours, 16 to 72 hours, or 1, 2, 3, 4, 5, 6, 7 days.

In embodiments, the cellulase or cellulase/hemicellulose enzyme mixture is applied in combination with a protease in amounts effective to facilitate or improve the process of sludge dewatering comprising treating sludge with a cellulase or cellulase/hemicellulose enzyme mixture and protease, preferably, prior to conventional sludge conditioning and dewatering operations. Examples of suitable amounts of cellulase or cellulase/hemicellulose enzyme mixture to combine with protease include 0.002 to 0.4 g protein per kg of total suspended solids, 0.01 to 0.1 g of protein per kg of total suspended solids, 0.02 to 0.1 g of protein per kg of total suspended solids. In embodiments, cellulase or cellulase/hemicellulose enzyme mixture is dosed at 1-100 g EP/DT. In embodiments, cellulase or cellulase/hemicellulose enzyme mixture is dosed at about 50 g EP/DT (~50 ppm).

In embodiments, suitable cellulase and cellulase/hemicellulase mixtures for use in accordance with the present disclosure are described in WO 2013/028928. Suitable enzyme compositions for use in accordance with the present disclosure include *Aspergillus fumigatus* cellobiohydrolase I, *Aspergillus fumigatus* cellobiohydrolase II, an *Aspergillus fumigatus* beta-glucosidase or variant thereof, *Penicillium* sp. (emersonii) GH61 polypeptide having cellulolytic enhancing activity, *Aspergillus fumigatus* xylanase, or *Aspergillus fumigatus* beta-xylosidase, or homologs thereof, may be used.

Suitable protease in accordance with the present disclosure includes enzymes capable of cleaving the amide linkages in protein, or (interchangeably) peptidases (see Walsh, 1979, *Enzymatic Reaction Mechanisms*. W.H. Freeman and Company, San Francisco, Chapter 3).

Serine proteases are suitable for use in accordance with the present disclosure. A serine protease is an enzyme which catalyzes the hydrolysis of peptide bonds, and in which there is an essential serine residue at the active site (White, Handler and Smith, 1973 *"Principles of Biochemistry,"* Fifth Edition, McGraw-Hill Book Company, NY, pp. 271-272).

The bacterial serine proteases have molecular weights in the 20,000 to 45,000 Dalton range. They are inhibited by diisopropylfluorophosphate. They hydrolyze simple terminal esters and are similar in activity to eukaryotic chymotrypsin, also a serine protease. A more narrow term, alkaline protease, covering a sub-group, reflects the high pH optimum of some of the serine proteases, from pH 9.0 to 11.0 (for review, see Priest, 1977, *Bacteriological Rev.* 41: 711-753).

In embodiments, subtilases are suitable for use in accordance with the present disclosure. Subtilase refers to a sub-group of the serine proteases as proposed by Siezen et al., 1991, *Protein Engng.* 4: 719-737 and Siezen et al., 1997, *Protein Science* 6: 501-523. They are defined by homology analysis of more than 170 amino acid sequences of serine proteases previously referred to as subtilisin-like proteases. A subtilisin was previously often defined as a serine protease produced by Gram-positive bacteria or fungi, and according to Siezen et al. now is a subgroup of the subtilases. A wide variety of subtilases have been identified, and the amino acid sequence of a number of subtilases has been determined. For a more detailed description of such subtilases and their amino acid sequences reference is made to Siezen et al. (1997).

One subgroup of the subtilases for use in accordance with the present disclosure includes, I-S1 or "true" subtilisins, comprises the "classical" subtilisins, such as subtilisin 168 (BSS168), subtilisin BPN', subtilisin Carlsberg (ALCALASE®, NOVOZYMES A/S), and subtilisin DY (BSSDY).

A further subgroup of the subtilases for use in accordance with the present disclosure includes the subtilases, I-S2 or high alkaline subtilisins, as recognized by Siezen et al. (supra). Sub-group I-S2 proteases are described as highly alkaline subtilisins and comprises enzymes such as subtilisin PB92 (BAALKP) (MAXACAL®, Gist-Brocades NV), subtilisin 309 (SAVINASE®, NOVOZYMES A/S), subtilisin 147 (BLS147) (ESPERASE®, NOVOZYMES A/S), and alkaline elastase YaB (BSEYAB).

In embodiments, SAVINASE brand protease is suitable for use in accordance with the present disclosure. SAVINASE® is marketed by NOVOZYMES A/S. It is subtilisin 309 from *B. lentus*. SAVINASE® has the amino acid sequence shown in SEQ ID NO: 1.

In embodiments, the protease is the commercial protease enzyme composition SAVINASE brand protease (available from Novozymes North America, Inc. or Novozymes A/S). In embodiments, suitable proteases are described in WO 99/27082 and WO 2003/006602 both of which are incorporated by reference in their entirety. In embodiments, the enzyme composition comprises a protease having at least 50% sequence identity, at least 60% sequence identity, at least 70% sequence identity, at least 75% sequence identity, at least 80% sequence identity, at least 85% sequence identity, at least 90% sequence identity, at least 95% sequence identity, at least 96% sequence identity, at least 97% sequence identity, at least 98% sequence identity, or at least 99% sequence identity to a protease as shown in SEQ ID NO:1. For purposes of the present disclosure, the sequence identity between two amino acid sequences is determined using the Needleman-Wunsch algorithm (Needleman and Wunsch, 1970, *J. Mol. Biol.* 48: 443-453) as implemented in the Needle program of the EMBOSS package (EMBOSS: The European Molecular Biology Open Software Suite, Rice et al., 2000, *Trends Genet.* 16: 276-277), preferably version 5.0.0 or later. The parameters used are gap open penalty of 10, gap extension penalty of 0.5, and the EBLOSUM62 (EMBOSS version of BLOSUM62) substitution matrix. The output of Needle labeled "longest identity" (obtained using the -nobrief option) is used as the percent identity and is calculated as follows:

(Identical Residues×100)/(Length of Alignment−Total Number of Gaps in Alignment)

In embodiments, the protease such as SAVINASE brand protease is applied in amounts effective to facilitate or improve the process of sludge dewatering comprising treating sludge with a cellulase and protease, preferably, prior to conventional sludge conditioning and dewatering operations including but not limited to concentration and mechanical dewatering. Examples of suitable amounts of protease include 0.004 to 0.09 g protein per kg of total suspended solids, 0.002 to 0.02 g of protein per kg of total suspended solids, 0.004 to 0.02 g of protein per kg of total suspended solids. In embodiments, SAVINASE brand protease is dosed at 0.4-90 g EP/DT. In embodiments, SAVINASE brand protease is dosed at 20 g EP/DT (~20 ppm).

Protease such as SAVINASE protease may be applied under conditions suitable to the sludge processing conditions, such as, for example, temperatures from 20 to 60° C., pH conditions from 4 to 10, and for a treatment time of 1 to 100 hours, 16 to 72 hours, or 1, 2, 3, 4, 5, 6, 7 days.

The cellulase/protease treatment in accordance with the present disclosure may also involve the addition of one or more additional enzymes.

The cellulase/protease treatment in accordance with the present disclosure may also result in an unexpected synergistic enzyme effect on the dewatering process. In accordance with this disclosure, the application of the cellulase/protease treatment will result in a significantly better enhancement of the dewatering process compared to sum of the effect on the dewatering process when the application of the cellulase and protease occurs separately.

In embodiments, treatments in accordance with the present disclosure are applied in the sludge conditioning step where polymers are being currently used. The enzymatic product is a consumable and will not require any hardware with it other than the capability to dispense it appropriately by the wastewater treatment plant. A buffer tank may be applied in embodiments so that enzyme can be applied under conditions in accordance with the present disclosure. In embodiments, treatments in accordance with the present disclosure will completely replace polymer use in wastewater treatment. In embodiments, treatments in accordance with the present disclosure will reduce polymer use in wastewater treatment. In embodiments, the use of enzymes will be system/configuration agnostic. As long as a particular plant is conditioning the sludge prior to dewatering the proposed cellulase/protease compositions in accordance with the present disclosure can be used.

Referring to FIG. 1, a non-limiting schematic diagram of embodiments of the present disclosure is shown. Here, wastewater treatment (10) is shown where raw wastewater (20) enters treatment and forms a process stream (22). In a non-limiting example, process stream (22) flows through a grit chamber (24), clarifier (26), biological treatment (28) and clarifier (30) before either recirculating, exiting, or advancing down the process stream. Primary sludge (32) and secondary sludge (34) are shown advancing towards concentration (36). The sludge is shown entering digestion (38) and forming tertiary or digested sludge (40) which enters buffer tank (39) for incubation prior to mechanical dewatering (42), contact with flocculants (44) and sludge output (46). FIG. 1 shows enzyme (48) of the present disclosure such as cellulase or cellulase/hemicellulase mixtures and protease being contacted with the process stream prior to concentration (36) and mechanical dewatering (42). FIG. 1 is non-limiting in that enzyme (48) in accordance with the present disclosure can contact the process stream after digestion and/or before or during dewatering.

In embodiments, and as shown in FIG. 1, the enzyme treatment in accordance with the present disclosure including effective amount of cellulase or effective amount of cellulase/hemicellulase enzyme mixture and effective amount of protease is preferably added prior to sludge conditioning (i.e., prior to coagulation and/or flocculation) and mechanical dewatering.

EXAMPLES

Example 1

Materials
Digested sludge from a municipal wastewater plant
Cellic® CTec3 brand cellulase and hemicellulase complex (available from Novozymes A/S).
SAVINASE brand protease (available from Novozymes A/S).
Heating cabinet (30° C.)

Pretreating Method
1. Measure 30 mL of sludge into a 50 mL tube
2. Add sufficient amount of liquid Cellic® CTec3 brand cellulase and hemicellulase complex and SAVINASE brand protease to the sludge sample
3. Seal the reaction tube and put into a heating cabinet at 30° C.
4. Remove from heating cabinet after 24 hrs of reaction time

TABLE 1

| | | | | | | | Polymer | Supernatant | Cake |
|---|---|---|---|---|---|---|---|---|---|
| | Vol. | | Dose (kg-product/ | | Dose (kg-product/ | | Dose Avg. | Turbidity Avg. | Solids Avg. |
| Sample | (mL) | Protease | t-DS) | Cellulase | t-DS) | Polymer | (kg/t-DS) | (ABS 450 nm) | (% w/w) |
| Sludge only | 30 | | | | | PAM | 9.4 (0.0) | 0.134 (0.002) | 18% (0.7%) |
| Protease only | 30 | Savinase | 1.0 | | | PAM | 8.9 (0.6) | 0.336 (0.004) | 17% (0.4%) |
| Cellulase only | 30 | | | CTec3 | 1.0 | PAM | 9.2 (0.6) | 0.388 (0.006) | 16% (0.2%) |
| Protease + Cellulase | 30 | Savinase | 1.0 | Ctec3 | 1.0 | PAM | 7.7 (0.2) | 0.212 (0.003) | 17% (0.7%) |

5. The sludge sample is now a pretreated sludge composition and ready for use in dewatering trials Lab Scale Dewatering: Materials & Method
Materials
A potato ricer or press
Flocculent—cationic polyacrylamide high molecular weight polymer
A beaker for mixing sludge and flocculent
A filter cloth
Crucible for dry solids analysis
Method
1. Prepare the polymer solution by mixing the polymer (in solid or emulsion form) into the required amount of de-ionized water to prepare a 0.25% active solution. Prepare 30 min before being required.
2. Once the polymer is ready, pour the sludge sample into a beaker.
3. Using a pipette, add a known volume of polymer solution. Stir immediately using an even, but not too vigorous action. A maximum of 0.5 mL should be added at a time.
4. Continue adding polymer solution to the sludge until the majority of the sludge solids is in a floc and the free water is clear. Record the volume of polymer solution added and also note the quality of the floc.
5. Once the sludge is flocculated, it can be pressed. Place the filter cloth into the press and the pour the sludge into it. Beware not to lose any sludge around the cloth, and place a beaker under the press to capture the filtrate.
6. Once the sludge is in the filter cloth, wrap it carefully so that no sludge can escape once the press is applied. Ensure all the filtrate is captured.
7. Press the sludge as much as possible, and then tie the handles to together using a quick-tie. This will be your reference pressure for the following samples.
8. After 120-180 sec, release the pressure by removing the quick-tie and unwrap the sludge cake.
9. Carefully peel the sludge cake from the cloth and place in the pre-weighed crucible. Weigh the crucible+cake and then allow to dry at 105° C. for at least 12 hrs.
10. Remove crucible after drying and weigh the crucible+ dry cake. The dry solids content of the cake can then be calculated.
11. Take the filtrate and undertake COD and turbidity analyses, taking note of the volume used. Use the remaining to undertake a dry solids analysis at 105° C.

Results
Each sample was processed in triplicate. The results from the trial are in Table 1:

The results indicate that the protease such as SAVINASE® brand protease from Novozymes A/S and cellulase such as Cellic® CTec3 brand cellulase and hemicellulase complex from Novozymes A/S when applied alone resulted in a 5% and 2% reduction in polymer requirement, respectively, compared to the sludge only sample. When the same dose of enzymes was applied together, an 18% reduction in polymer requirement was realized.

The combination of protease and cellulase also lead to an improved quality in the filtrate compared to when the enzymes were applied singly. The application of the protease and cellulase together did not lead to a lower cake dryness or degradation in filtrate quality compared to the sludge only control sample.

Example 1 Conclusions

The application of the protease and cellulase separately did not provide a significant decrease in the polymer consumption required to achieve a good level of solids flocculation and dewaterability using the press method The application of the protease and cellulase together lead to a significant decrease in polymer requirement, while maintaining the quality of the filtrate and the dryness of the cake achieved in the dewatering process Example 2

Materials
Digested Sludge from a Municipal Wastewater Plant
Cellic® CTec3 brand cellulase and hemicellulase complex (available from Novozymes A/S).
SAVINASE brand protease (available from Novozymes A/S).
Heating cabinet (30° C.)
Method
1. Measure 30 mL of sludge into a 50 mL tube
2. Add the required amount of liquid enzyme product to the sludge sample
3. Seal the reaction tube and put into a heating cabinet at 30° C.

4. Remove from heating cabinet after required reaction time (24, 48 and 72 hrs)
5. The sludge sample is now ready for use in dewatering trials

TABLE 2

Experiment set-up used in the trials conducted

| | 24 hrs | 48 hrs | 72 hrs |
|---|---|---|---|
| Control Sludge only | 3 samples | 3 samples | 3 samples |
| Enzyme 1 SAVINASE 125 g product/t-DS | 3 samples | 3 samples | 3 samples |
| Enzyme 2- CTec3 125 g product/t-DS | 3 samples | 3 samples | 3 samples |
| Enzyme 1 + 2 250 g product/t-DS | 3 samples | 3 samples | 3 samples |
| Sludge only Polymer dose at lowest level used with enzyme samples | 3 samples | 3 samples | 3 samples |

Figure 2:
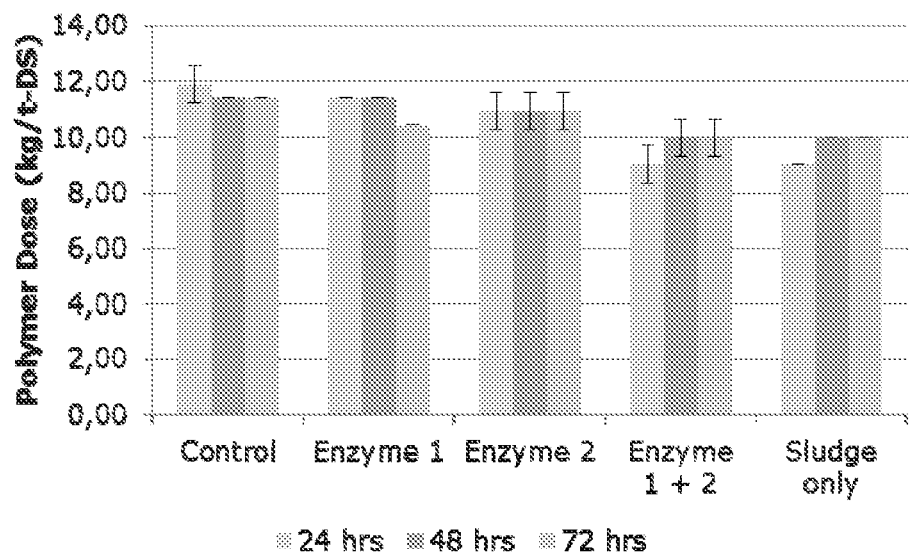
FIG. 2 is a graph of average polymer dose required for dewatering for each enzyme dosing condition where Enzyme 1 is SAVINASE brand protease and Enzyme 2 is Cellic® CTec3 brand cellulase and hemicellulase complex.
Figure 3:
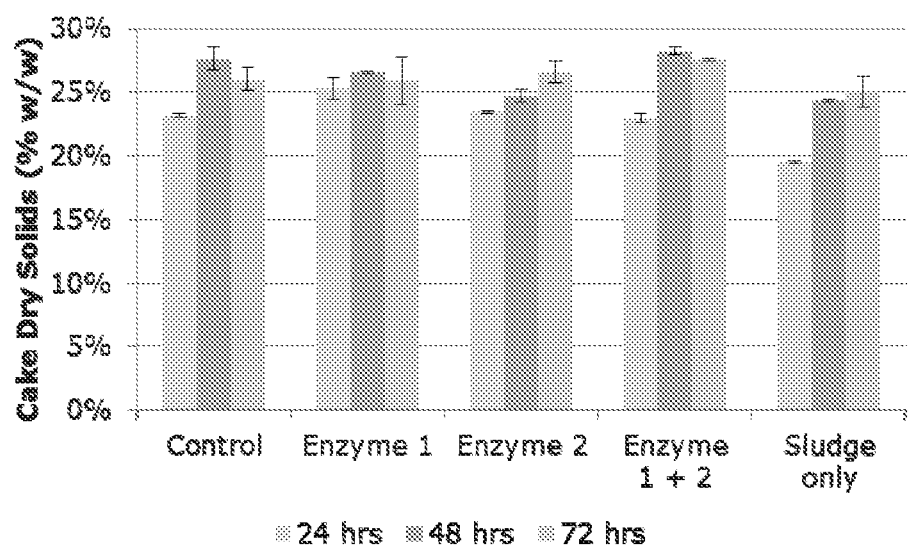
FIG. 3 is a graph of the average dry solids (DS) of the sludge cakes produced in the trials where Enzyme 1 is SAVINASE brand protease and Enzyme 2 is Cellic® CTec3 brand cellulase and hemicellulase complex.
Figure 4:
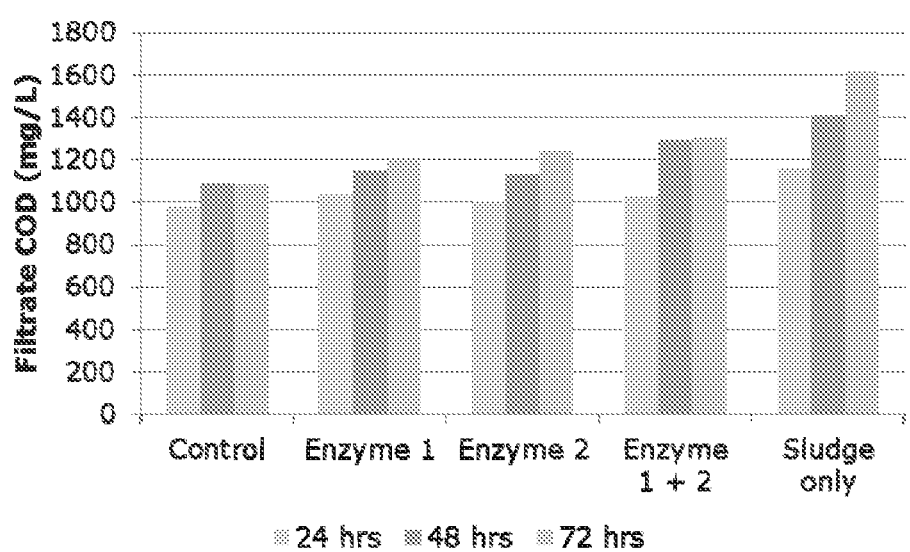
FIG. 4 is a graph of the COD of filtrate samples taken during the trials where Enzyme 1 is SAVINASE brand protease and Enzyme 2 is Cellic® CTec3 brand cellulase and hemicellulase complex.

Lab Scale Dewatering: Materials & Method
Materials
  A potato ricer or press
  Flocculent—Flopam FO-4490 (SNF) prepared in a 0.3% solution with deionized water
  A beaker for mixing sludge and flocculent
  Filter cloths
  Crucible for dry solids analysis
  Hach Lange COD kits (0-1500 mg/L)
Method
Apply the same methods steps as set forth in Example 1 above.
Results
  The results for the trials focused on three key parameters for dewatering:
  1. Polymer dose required
  2. Dry solids of the cake produced
  3. COD in the filtrate produced in the dewatering process
  When considering the polymer dose required, the results are presented in FIG. 2 Samples were taken after 24, 48 and 72 hrs.
  After 24 hours, a 24% reduction (equivalent to 2.85 kg-polymer/t-DS) the polymer dose required for dewatering was achieved when Enzymes 1+2 were used to pre-treat the sludge. After 48 and 72 hrs, a reduction of 13% in the polymer dose required was achieved (equivalent to 1.43 kg-polymer/t-DS), when the two enzymes were used together to pre-treat the sludge.
  After 24 hours, the addition of the Savinase and CTec3 enzymes together led to a significantly greater reduction in polymer requirement compared to when the enzymes were added singly. This indicates that the two enzymes have a synergistic effect for reducing polymer requirement when used together on anaerobically digested sludge.
  In each case the polymer reduction achieved was >10%.
  The dry solids (DS) of the cakes produced in the dewatering trials are presented in FIG. 3. Samples were taken after 24, 48 and 72 hrs.
  After 24 hours of incubation time, the application of Enzyme 1 lead to an average increase in DS of 2% points. The application of Enzyme 2 alone, or both enzymes together led to a DS that was the same as the control sample. With the sludge only sample, where polymer was dosed at the lowest level needed in the enzyme pre-treated samples, the DS of the cake was significantly lower than the control or enzyme treated samples. This indicates that enzyme pre-treatment not only allows for a decrease in polymer dose needed for dewatering, but has the potential to maintain or improve the DS of the cake produced compared to a current situation (control sample).
  After 48 hours of incubation, there was no positive impact of the enzyme pre-treatments on the DS of the cake when compared to the control sample. While the samples incubated with both enzyme products was able to maintain the same DS as the control, the single enzyme incubated samples showed slight average decreases in cake DS. All of the enzyme pre-treated samples were better than the sludge only sample.
  After 72 hours of incubation, the samples incubated with both enzymes had an average DS content that was 2% higher than the control sample. There was no significant impact on the cake DS when only one enzyme was applied to the sludge samples. All of the enzyme pre-treated samples were better than the sludge only sample.
  The cake DS results indicate that enzymatic pre-treatment has a positive effect on the cake DS achieved. After 24 hours, the Enzyme 1 product was able to provide an increase in DS.
  In all cases, the enzyme pre-treatment seems to be able to counter-balance the lower polymer dose provided in the sludge only sample, allowing the dewatering process to achieve the same or improved cake DS, with a significantly lower dose of polymer. The results indicate that a longer retention time at the site could lead to positive benefits with regards to DS increase in the cake produced in the dewatering process.
  The quality of the filtrate was monitored during the trials through the measurement of COD in the filtrates. A total COD was used, capturing both contributions from soluble and insoluble components in the filtrate. The results of this analysis are presented in FIG. 4. Samples were taken after 24, 48 and 72 hrs.
  In all cases, the longer the retention time, the higher the COD in the filtrate. This is likely caused by the solubilization of the sludge either through natural processes in the sludge or assisted by enzymatic activity. After 24 hrs, the impact of the enzymes on the COD in the filtrate is minimal. However, after 48 and 72 hrs, there is a clear effect of the enzymatic activity—which is seen in the significantly increased concentration of COD in the filtrate. This indicates that after 24 hrs, the enzymes have only been active on the "soluble" biocolloid component of the sludge. This is confirmed by the significant polymer dose reduction seen after 24 hrs. However, as the retention time increases, the enzymes have a more significant impact on the bulk solids in the sludge. This enzymatic activity releases more biocolloid type materials into the sludge, thereby increasing the COD of the filtrate, but allowing for a better mechanical dewatering of the sludge (better able to compress the solids). These results support the results presented above for polymer dose reduction and cake DS increase.
  The COD in the filtrate of the sludge only samples (where a lower dose of polymer was used on sludge that was not pre-treated with enzymes) was always significantly higher than the control sample, or the enzyme pre-treated samples. This is due to the poorer solids capture in these samples, with the increase in COD caused by solids in the filtrate.

In summary, the best performing samples for each retention time are listed in Table 3:

TABLE 3

Summary of best case scenarios for each retention/incubation time tested

|  | 24 hrs | 48 hrs | 72 hrs |
|---|---|---|---|
| Polymer reduction | Enzymes 1 + 2 −24% | Enzymes 1 + 2 −13% | Enzyme 1 + 2 −13% |
| Cake DS increase | Enzyme 1 +2% points | Enzymes 1 + 2 <1% point | Enzymes 1 + 2 +2% points |

Conclusions of Example 2

Overall, the application of enzymes to the sludge digested sludge sample showed positive results, both with regards to polymer reduction and cake solids increase. Key findings from this trial on digested sludge include:

The combination of Savinase and CTec3 led to a significantly higher level of polymer reduction required in the dewatering process compared to the control sample or when the enzymes were added separately. This indicates that there is a synergistic effect when the enzymes are added together.

The effect of the enzymes on polymer reduction decreases over time, likely due to the activity of the enzymes on the sludge solids, releasing more "soluble" biocolloids. This is reflected in the filtrate COD results.

Generally, the results indicate that a shorter enzyme incubation time is more suitable for polymer reduction, while a longer retention time can provide significant cake DS benefits. This outcome fits well when the enzyme products that are applied are considered, and their activity on the bulk solids in the sludge is confirmed in the COD results.

It will be understood that various modifications may be made to the embodiments disclosed herein. Therefore, the above description should not be construed as limiting, but merely as exemplifications of embodiments. Those skilled in art will envision other modifications within the scope and spirit of the claims appended hereto. Moreover, terms should not be interpreted as implying any particular order among or between various steps herein disclosed unless and except when the order of individual steps is explicitly described.

The invention claimed is:

1. A method of treating sludge, the method comprising:
   (a) contacting sludge with a cellulase enzyme or a cellulase/hemicellulase mixture, and a protease having at least 90% sequence identity to SEQ ID NO: 1 in amounts effective to enhance the process of sludge dewatering;
   (b) conditioning the sludge with a polymeric flocculating agent until a majority of the solids of the sludge is in a floc; and
   (c) removing water from the sludge.

2. The method of claim 1, wherein the dose of cellulase or cellulase/hemicellulase mixture is between 10 and 2000 g per dry ton of total suspended solids and the dose of the protease is between 10 and 2000 g per dry ton of total suspended solids.

3. The method of claim 1, wherein the dose of cellulase or cellulase/hemicellulase mixture is between 10 and 1000 g per dry ton of total suspended solids and the dose of the protease is between 10 and 1000 g per dry ton of total suspended solids.

4. The method of claim 1, wherein the dose of cellulase or cellulase/hemicellulase mixture is between 50 and 500 g per dry ton of total suspended solids and the dose of the protease is between 50 and 500 g per dry ton of total suspended solids.

5. The method of claim 1, wherein the dose of cellulase or cellulase/hemicellulase mixture is between 100 and 500 g per dry ton of total suspended solids.

6. The method of claim 1, wherein the dose of cellulase or cellulase/hemicellulase mixture is between 100 and 500 g per dry ton of total suspended solids and the dose of the protease is between 100 and 500 g per dry ton of total suspended solids.

7. The method of claim 1, wherein the cellulase or cellulase/hemicellulase mixture and protease enzyme is allowed to incubate with the sludge for 1 minute to 96 hours at a temperature of 20-60° C.

8. The method of claim 7, wherein the cellulase or cellulase/hemicellulase mixture and protease enzyme is allowed to incubate with the sludge for 16-72 hours.

9. The method of claim 1, wherein the cellulase or cellulase/hemicellulase mixture and protease enzyme is allowed to incubate with the sludge for 1 to 3 days.

10. The method of claim 1, wherein the sludge is generated during conventional municipal and industrial wastewater treatment operations.

11. The method of claim 10, wherein the sludge is selected from the group consisting of anaerobically digested sludge and aerobically digested sludge.

12. The method of claim 1, wherein the cellulase or cellulase/hemicellulase mixture comprises one or more endoglucanases, one or more cellobiohydrolases, and/or one or more beta-glucosidases.

13. The method of claim 1, wherein the cellulase/hemicellulase mixture comprises one or more GH10 xylanases.

14. The method of claim 1, wherein the cellulase/hemicellulase mixture comprises one or more beta-xylosidases.

15. The method of claim 1, wherein the cellulase or cellulase/hemicellulase mixture comprises an *Aspergillus fumigatus* cellobiohydrolase I and an *Aspergillus fumigatus* cellobiohydrolase II.

16. The method of claim 1, wherein the cellulase/hemicellulase mixture comprises a GH10 xylanase, a beta-xylosidase, a beta-glucosidase variant and/or a *Penicillium* sp. GH61 polypeptide.

17. The method of claim 1, wherein the protease has at least 95% sequence identity to SEQ ID NO: 1.

18. The method of claim 1, wherein the protease has at least 97% sequence identity to SEQ ID NO: 1.

19. The method of claim 1, wherein the protease comprises or consists of the protease sequence shown in SEQ ID NO: 1.

20. The method of claim 1, wherein the amount of polymeric flocculating agent of step (b) is reduced compared to the method using the enzymes of step (a) individually.

* * * * *